US011175906B2

(12) United States Patent
Jeong et al.

(10) Patent No.: US 11,175,906 B2
(45) Date of Patent: Nov. 16, 2021

(54) APPARATUS AND METHOD FOR CONTROLLING UPDATE OF VEHICLE

(71) Applicants: HYUNDAI MOTOR COMPANY, Seoul (KR); KIA MOTORS CORPORATION, Seoul (KR)

(72) Inventors: Hyeok Sang Jeong, Gunpo-si (KR); Myeong Gyu Jeong, Seoul (KR); Dong Youl Lee, Seoul (KR); Jae Am Seo, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/657,577

(22) Filed: Oct. 18, 2019

(65) Prior Publication Data
US 2020/0387368 A1    Dec. 10, 2020

(30) Foreign Application Priority Data
Jun. 10, 2019  (KR) .......................... 10-2019-0068138

(51) Int. Cl.
*G06F 8/65*      (2018.01)
*G06F 8/656*     (2018.01)
*H04L 29/08*     (2006.01)
*G07C 5/00*      (2006.01)

(52) U.S. Cl.
CPC .............. *G06F 8/66* (2013.01); *G06F 8/656* (2018.02); *G07C 5/008* (2013.01); *H04L 67/12* (2013.01); *H04L 67/34* (2013.01)

(58) Field of Classification Search
USPC ......................................................... 717/168
See application file for complete search history.

(56) References Cited

U.S. PATENT DOCUMENTS

| 10,042,629 B2* | 8/2018 | Sarkar ....................... G06F 8/65 |
| 2018/0056938 A1* | 3/2018 | Shin ......................... E05F 15/76 |
| 2018/0107473 A1* | 4/2018 | Ahmed .................... H04L 67/34 |
| 2018/0196656 A1* | 7/2018 | Miller ...................... H04L 67/34 |
| 2019/0227785 A1* | 7/2019 | Kanamori ........... G06F 11/3055 |
| 2019/0361696 A1* | 11/2019 | Nakano .................. B60R 16/02 |
| 2020/0034134 A1* | 1/2020 | Jayaraman .............. H04W 4/02 |
| 2020/0156629 A1* | 5/2020 | Shin ............... B60W 30/18163 |
| 2020/0192655 A1* | 6/2020 | Jeong .................. G07C 5/0808 |

(Continued)

OTHER PUBLICATIONS

Mckenna, "Making full vehicle OTA updates a reality", 2016, NPX B.V (Year: 2016).*

(Continued)

*Primary Examiner* — Hossain M Morshed
(74) *Attorney, Agent, or Firm* — Morgan, Lewis & Bockius LLP (57) ABSTRACT

An apparatus and a method for controlling firmware update of a vehicle are provided. The apparatus may include a state manager configured to manage state information regarding a plurality of controllers included in the vehicle, a control device configured to determine whether to perform an update based on the state information when an ignition of the vehicle is turned off, and an update manager configured to perform a reprogramming operation on at least one controller of the plurality of controllers depending on whether to perform the update.

21 Claims, 11 Drawing Sheets (56) References Cited

U.S. PATENT DOCUMENTS

2020/0334033 A1* 10/2020 Lee ........................ G07C 5/08
2020/0371774 A1* 11/2020 Kato ................. G06K 9/00832
2020/0387368 A1* 12/2020 Jeong ....................... G06F 8/65

OTHER PUBLICATIONS

Mansor, "Don't Brick Your Car: Firmware Confidentiality and Rollback for Vehicles", 2015, 10th International Conference on Availability, Reliability and Security (Year: 2015).*
Embitel, "Automotive ECU Re-programming", 2019, embitel (Year: 2019).*

* cited by examiner

APPARATUS AND METHOD FOR CONTROLLING UPDATE OF VEHICLE

CROSS-REFERENCE TO RELATED APPLICATION

The present application claims priority to and the benefit of Korean Patent Application No. 10-2019-0068138, filed on Jun. 10, 2019, which is incorporated herein by reference in its entirety.

TECHNICAL FIELD

The present disclosure relates to an apparatus and a method for controlling firmware update of a vehicle.

BACKGROUND

The statements in this section merely provide background information related to the present disclosure and may not constitute prior art.

The controller wireless update using Over the Air (OTA) is the technology in which a management controller wirelessly receives firmware from a server to update a controller on which reprogramming will be performed. The procedure of the controller wireless update may be divided into a download procedure between a server and the management controller and an update procedure between the management controller and the controller on which the reprogramming will be performed.

Generally, in the controller wireless update, the management controller in a vehicle automatically performs the reprogramming of each of the controllers. Accordingly, when the management controller performs the reprogramming without determining the state of a target controller, a user may be in danger due to operational error of the vehicle.

For example, even after the ignition is turned off in a situation where an engine overheated, the cooling fan may operate during a specific period. When the management controller attempts to reprogram an engine manager system (EMS) for controlling the engine after the ignition is turned off, the operation of the cooling fan may be interrupted, and thus parts may be damaged or fire may occur due to the overheated engine.

SUMMARY

The present disclosure provides an apparatus and a method that control an update of a vehicle such that a controller wireless update is stably performed by determining the operating state of each controller on which the reprogramming will be performed before the controller wireless update using OTA is performed.

In one form of the present disclosure, a vehicle firmware update controlling apparatus includes a state manager configured to manage state information regarding a plurality of controllers included in the vehicle; a control device configured to determine whether to perform the update based on the state information when an ignition of the vehicle is turned off; and an update manager configured to perform a reprogramming operation on at least one controller of the plurality of controllers depending on whether to perform the update.

The state manager is configured to transmit an update ready request signal to the plurality of controllers, when the ignition of the vehicle is turned off.

The state manager is configured to transmit the update ready request signal at a pre-specified period until reprogramming of each of the plurality of controllers is completed.

The state manager is configured to identify the state information based on a response signal received from each controller of the plurality of controllers in response to the update ready request signal.

The response signal comprises at least one response of a "Positive" response, a "Pending" response, or a "Negative" response.

The control device is configured to determine to interrupt the update of the vehicle, when the "Negative" response is received from at least one controller of the plurality of controllers.

The control device is configured to determine to perform the update of the vehicle, when a response signal received from the plurality of controllers corresponds to the "Positive" response or the "Pending" response.

The control device is configured to determine to interrupt the update of the vehicle, when all response signals received from the plurality of controllers correspond to the "Pending" responses and the "Positive" response is not received from the plurality of controllers until a reference time elapses.

The control device is configured to, when the "Positive" response is received from a controller of the plurality of controllers transmitting the "Pending" response within a reference time, transmit, to the update manager, a request for reprogramming of the controller of the plurality of controllers.

The control device is configured to, when at least one of the "Positive" responses is included in the response signal received from the plurality of controllers, transmit, to the update manager, a request for reprogramming of the controller of the plurality of controllers.

The update manager is configured to determine a reprogramming order of the plurality of controllers when a request for reprogramming of the plurality of controllers is received; and transmit, to a target controller of the plurality of controllers, a reprogramming execution instruction and read-only memory (ROM) data depending on the determined reprogramming order.

The control device is configured to redetermine whether to perform the update based on the state information when a reprogramming of a target controller of the plurality of controllers fails.

The control device is configured to determine to interrupt the update of the vehicle when a reprogramming of a target controller of the plurality of controllers fails.

In another form of the present disclosure, a method for controlling an update of a vehicle include managing, by a state manager, state information regarding a plurality of controllers included in the vehicle; when an ignition of the vehicle is turned off, determining, by a control device, whether to perform the update based on the state information; and performing, by an update manager, a reprogramming operation on at least one controller of the plurality of controllers depending on whether to perform the update.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some form of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
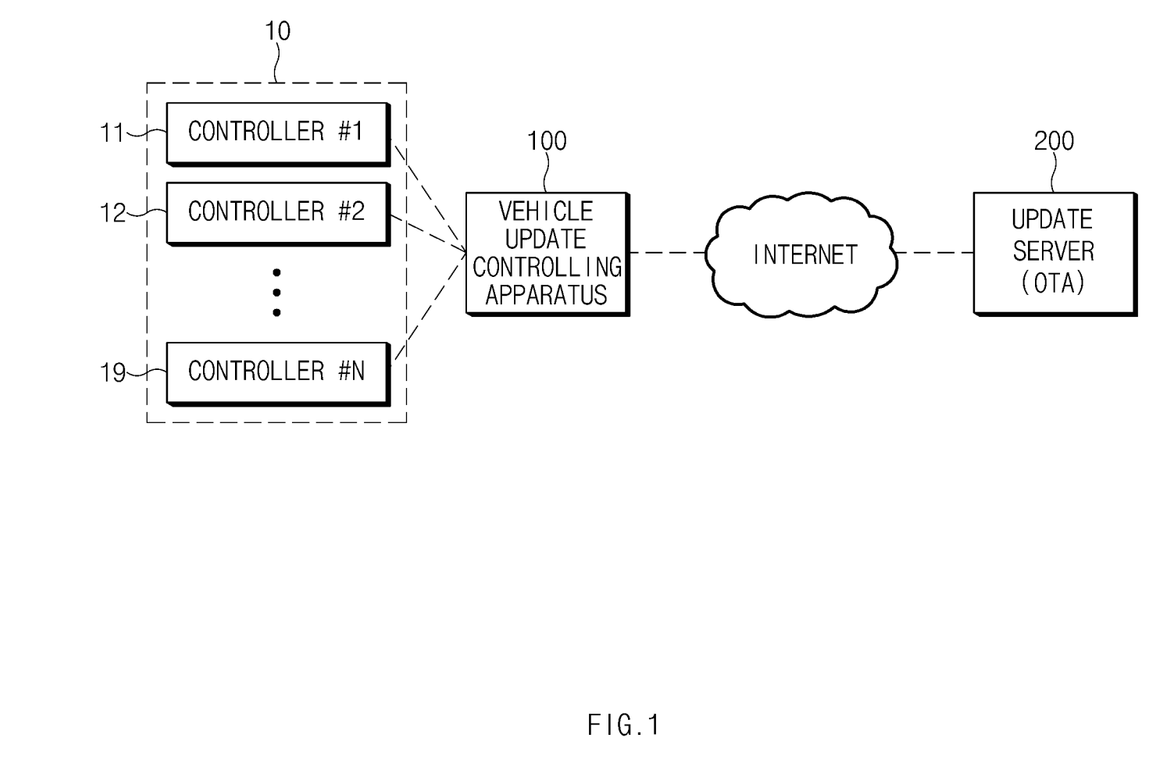
FIG. 1 is a diagram illustrating a configuration of a vehicle system to which a vehicle update controlling apparatus is applied, in one form of the present disclosure.

FIG. 1 is a diagram illustrating a configuration of a vehicle system to which a vehicle update controlling apparatus is applied, in some forms of the present disclosure.

Referring to FIG. 1, a vehicle system may include a plurality of controllers 10 and a vehicle update controlling apparatus 100.

Herein, the plurality of controllers 10 are controllers installed in a vehicle, and each of the controllers control some functions of a vehicle. For example, the plurality of controllers 10 may include Engine Manager System (EMS), Electronic Stability Control (ESC), Electronic Parking Brake (EPB), Anti-lock Brake System (ABS), Blind Spot Detection (BSD), and the like. In addition, the plurality of controllers 10 may include controllers that control various functions.

When the ignition of a vehicle is turned off, the vehicle update controlling apparatus 100 may perform the update of the vehicle.

The vehicle update controlling apparatus 100 may download ROM data for reprogramming the plurality of controllers 10, from an update server OTA 200. The vehicle update controlling apparatus 100 may be connected to the update server OTA 200 through Internet.

At this time, the vehicle update controlling apparatus 100 may transmit the ROM data downloaded from the update server OTA 200, to each of controllers 11, 12, . . . , and 19 together with a reprogramming command.

Herein, before transmitting the ROM data to each of the controllers 11, 12, . . . , and 19, the vehicle update controlling apparatus 100 may identify the states of the plurality of controllers 10 and may determine whether to perform an update based on the identification result.

For example, the vehicle update controlling apparatus 100 may transmit an update ready request signal such as "OTA_Ready" to each of the plurality of controllers 10. At this time, when the update ready request signal is received, the plurality of controllers 10 may determine the operating state of each controller in an ignition off state to transmit a response signal to the vehicle update controlling apparatus 100.

The vehicle update controlling apparatus 100 may determine the states of the plurality of controllers 10 based on response signals received from the plurality of controllers 10 and may determine whether to perform an update, based on the determination result.

When one of the plurality of controllers 10 is abnormal, the vehicle update controlling apparatus 100 may interrupt the update.

Figure 2:
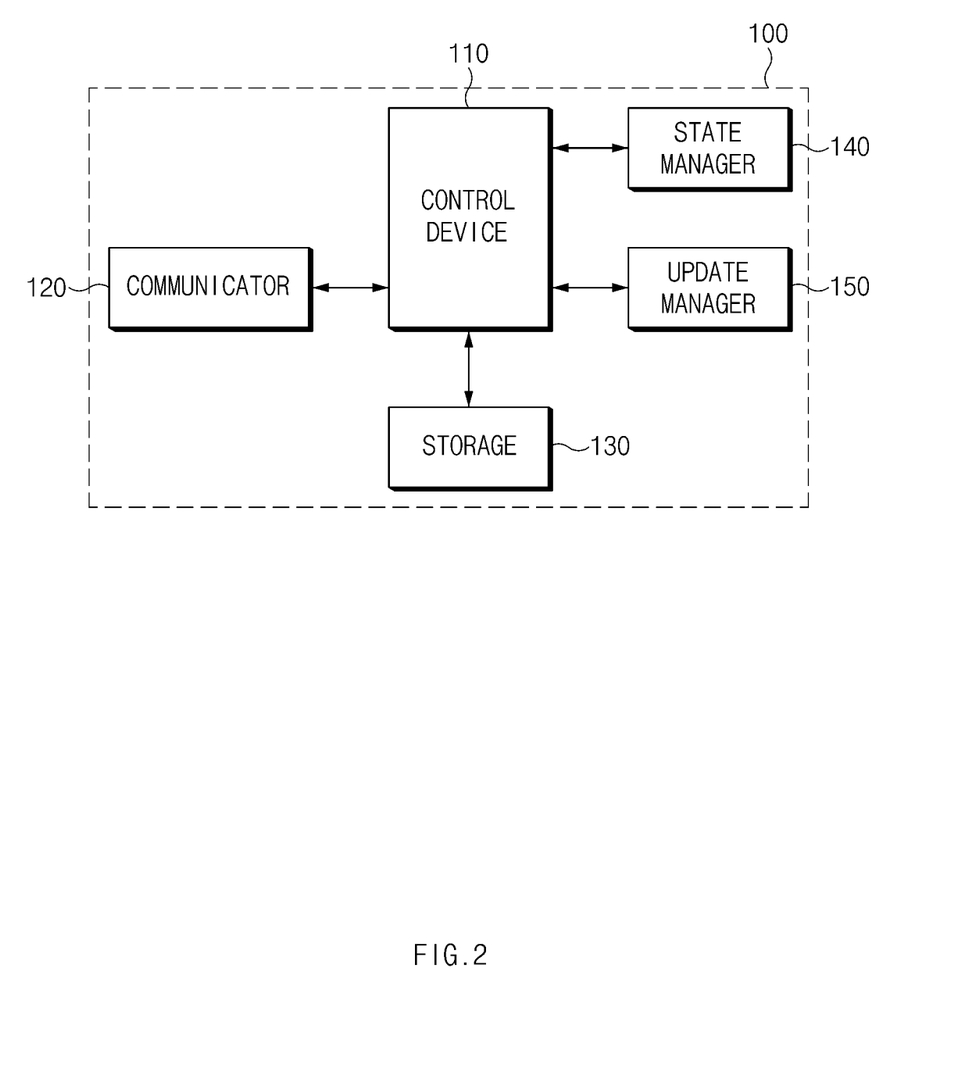
FIG. 2 is a block diagram illustrating a configuration of a vehicle update controlling apparatus, in one form of the present disclosure.

As such, the descriptions about the detailed configuration and the operation of the vehicle update controlling apparatus 100 will be referenced in FIG. 2.

The vehicle update controlling apparatus 100 in some forms of the present disclosure may be implemented inside a vehicle. At this time, the vehicle update controlling apparatus 100 may be integrally formed with internal control units of the vehicle; the vehicle update controlling apparatus 100 may be implemented as a separate apparatus to be connected to the control units of the vehicle by a separate connection means.

FIG. 2 is a block diagram illustrating a configuration of a vehicle update controlling apparatus, in some forms of the present disclosure.

Referring to FIG. 2, the vehicle update controlling apparatus 100 may include a control device 110, a communicator 120, storage 130, a state manager 140, and an update manager 150. Herein, the control device 110, the state manager 140, and the update manager 150 of the vehicle update controlling apparatus 100 in some forms of the present disclosure may be implemented with one or more processors.

The control device 110 may process the signal transmitted between the respective components of the apparatus 100.

The communicator 120 may include a communication module for vehicle network communication with the plurality of controllers 10 included in a vehicle. For example, the communication module may transmit an update ready request signal to the plurality of controllers 10 and may receive a response signal of each of the controllers for the update ready request signal.

Moreover, the communication module may transmit or receive a signal to or from automotive components included in the vehicle, in addition to the plurality of controllers 10.

Herein, the technology of the vehicle network communication may include Controller Area Network (CAN) communication, Local Interconnect Network (LIN) communication, Flex-Ray communication, or the like.

Furthermore, the communicator 120 may further include a communication module for wireless Internet access to the update server 200 or a communication module for short range communication.

Herein, the wireless Internet technology may include Wireless LAN (WLAN), Wireless Broadband (Wibro), Wi-Fi, World Interoperability for Microwave Access (Wimax), or the like. Also, the technology of the short range communication may include Bluetooth, ZigBee, Ultra Wideband (UWB), Radio Frequency Identification (RFD)), Infrared Data Association (IrDA), or the like.

The storage 130 may store data and/or an algorithm required to operate the vehicle update controlling apparatus 100.

The storage 130 may store the ROM data received through the communicator 120. In addition, the storage 130 may store information received from a plurality of controllers and state information of each controller. Furthermore, the storage 130 may determine whether to perform an update depending on the state of each controller and may store a command and/or an algorithm for performing the reprogramming of each controller.

Herein, the storage 130 may include a storage medium such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

The state manager 140 manages state information of the plurality of controllers 10. Before the update is performed when the vehicle is in an ignition off state, the state manager 140 transmits an update ready request signal, for example, "OTA_Ready" to the plurality of controllers 10 connected through the communicator 120. The state manager 140 may transmit the update ready request signal to controllers, in each of which the reprogramming is not completed, at a specific period until the reprogramming of each of the plurality of controllers 10 is completed.

At this time, a plurality of controllers may determine the operating state in the ignition off state of the vehicle in response to the update ready request signal and may return the response signal.

Herein, the response signal may include one response of "Positive" response, "Pending" response, or "Negative" response. "Positive" response may mean a state in which the reprogramming of the target controller is capable of being executed at once. Herein, the controller may not transmit "Negative" response or "Pending" response after "Positive" response.

"Pending" response may refer to a state where the reprogramming is currently impossible because there is a running function after the ignition of the vehicle is turned off but the reprogramming is possible within a reference time. In this case, the controller may return a response signal including "Positive" response within the reference time. "Negative" response may indicate a state where the reprogramming of the target controller is impossible or a state where the reprogramming is possible after the reference time elapses. Herein, the controller may not transmit "Positive" response or "Pending" response after "Negative" response.

When the response signal including one response of "Positive" response, "Pending" response, or "Negative" response is received from the plurality of controllers 10, the state manager 140 may identify the states of the controllers based on the response included in the received response signal.

The state manager 140 may transmit the identified state information of the plurality of controllers 10 to the control device 110.

As such, the control device 110 may determine whether to perform the update of a vehicle based on the state information of the plurality of controllers 10 received from the state manager 140. At this time, the control device 110 may determine whether to perform the update of the vehicle based on whether "Negative" response is included in the response signal of the controller.

In some forms of the present disclosure, determining whether to perform the update will be referenced to FIGS. 3A to 3D.

Figure 3A:
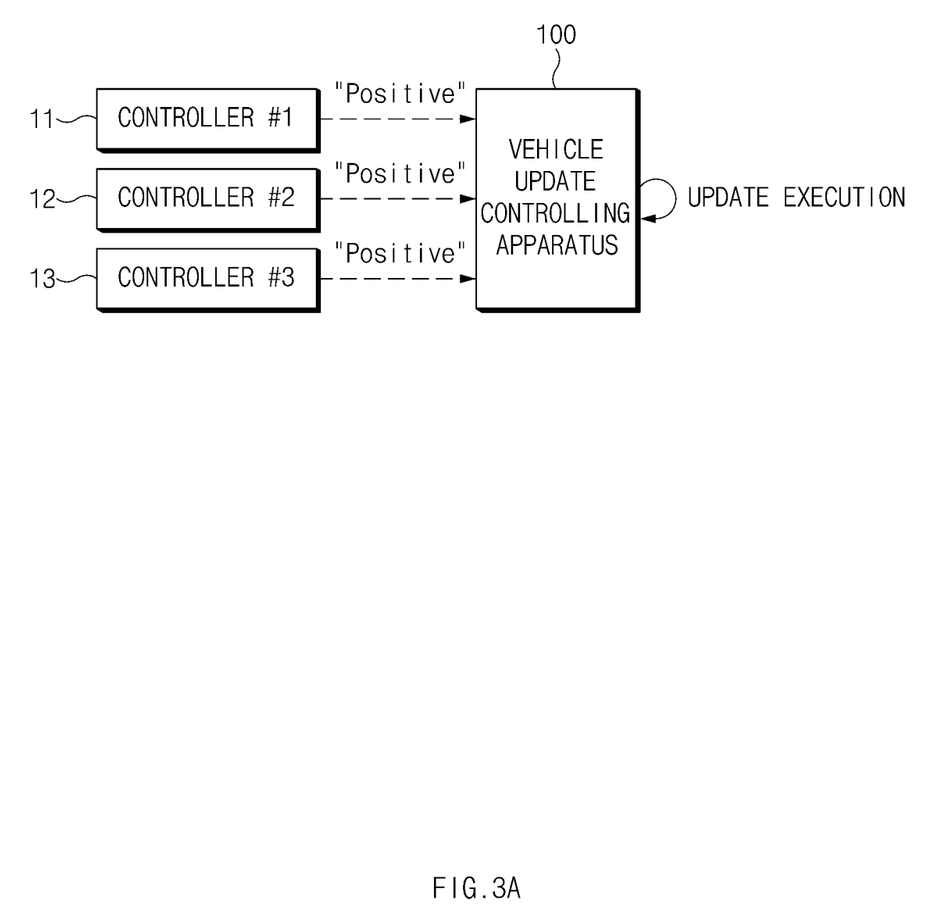
FIGS. 3A, 3B, 3C, and 3D are views describing an operation of a vehicle update controlling apparatus, in one form of the present disclosure.

First, FIG. 3A illustrates a situation when "Positive" response is received from all of a plurality of controllers.

Referring to FIG. 3A, the state manager 140 transmits an update ready request signal to the first controller 11, the second controller 12, and the third controller 13; then, when a response signal is received from the first controller 11, the second controller 12, and the third controller 13, the state manager 140 may identify the states of controllers to transmit the identified result to the control device 110.

At this time, when it is determined that "Positive" response is received from all of the first controller 11, the second controller 12, and the third controller 13, the control device 110 may determine to perform the update of a vehicle. In this case, the control device 110 may transmit the state information of each controller to the update manager 150 and then may make a request for performing a reprogramming operation.

Figure 3B:
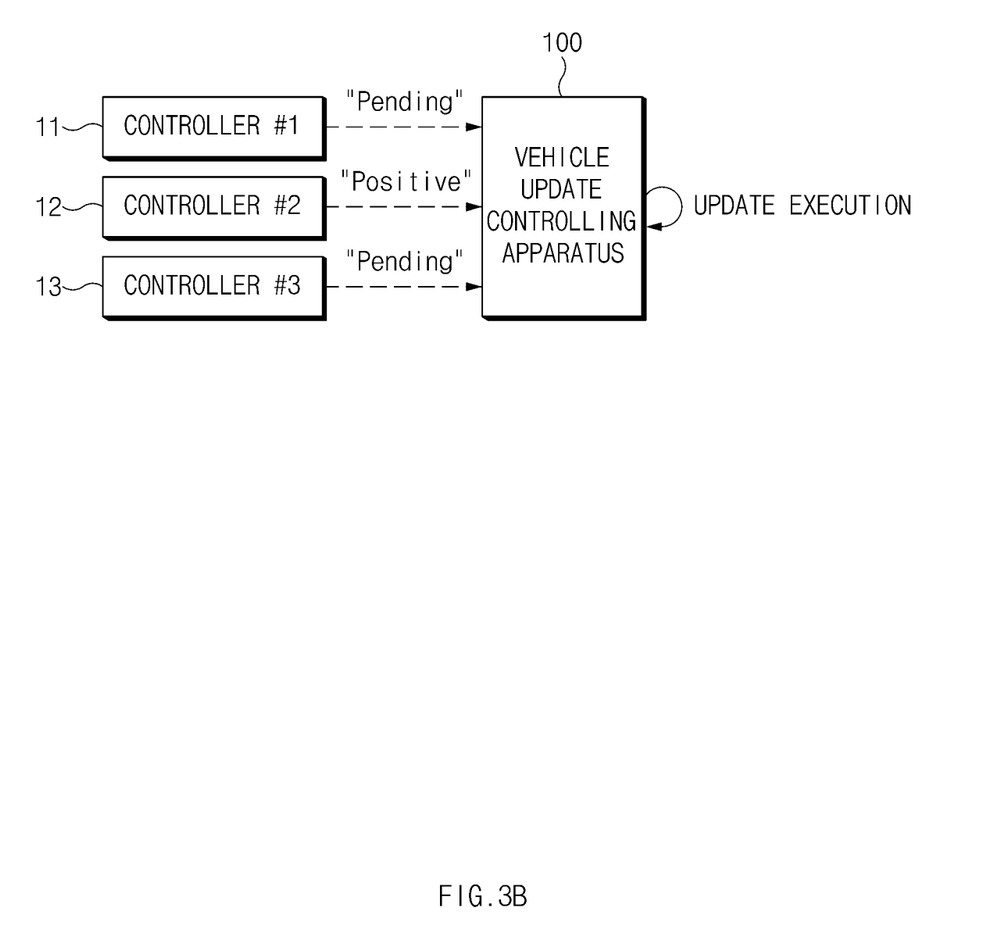

FIG. 3B illustrates a situation when "Positive" or "Pending" response is received from a plurality of controllers.

Referring to FIG. 3B, the state manager 140 transmits an update ready request signal to the first controller 11, the second controller 12, and the third controller 13; then, when a response signal is received from the first controller 11, the second controller 12, and the third controller 13, the state manager 140 may identify the states of controllers to transmit the identified result to the control device 110.

At this time, when it is determined that "Positive" response or "Pending" response is received from the first controller 11, the second controller 12, and the third controller 13, the control device 110 may determine to perform the update of a vehicle. In this case, the control device 110 may transmit the state information of each controller to the update manager 150 and then may make a request for performing a reprogramming operation of the second controller 12 that is in "Positive" state.

Figure 3C:
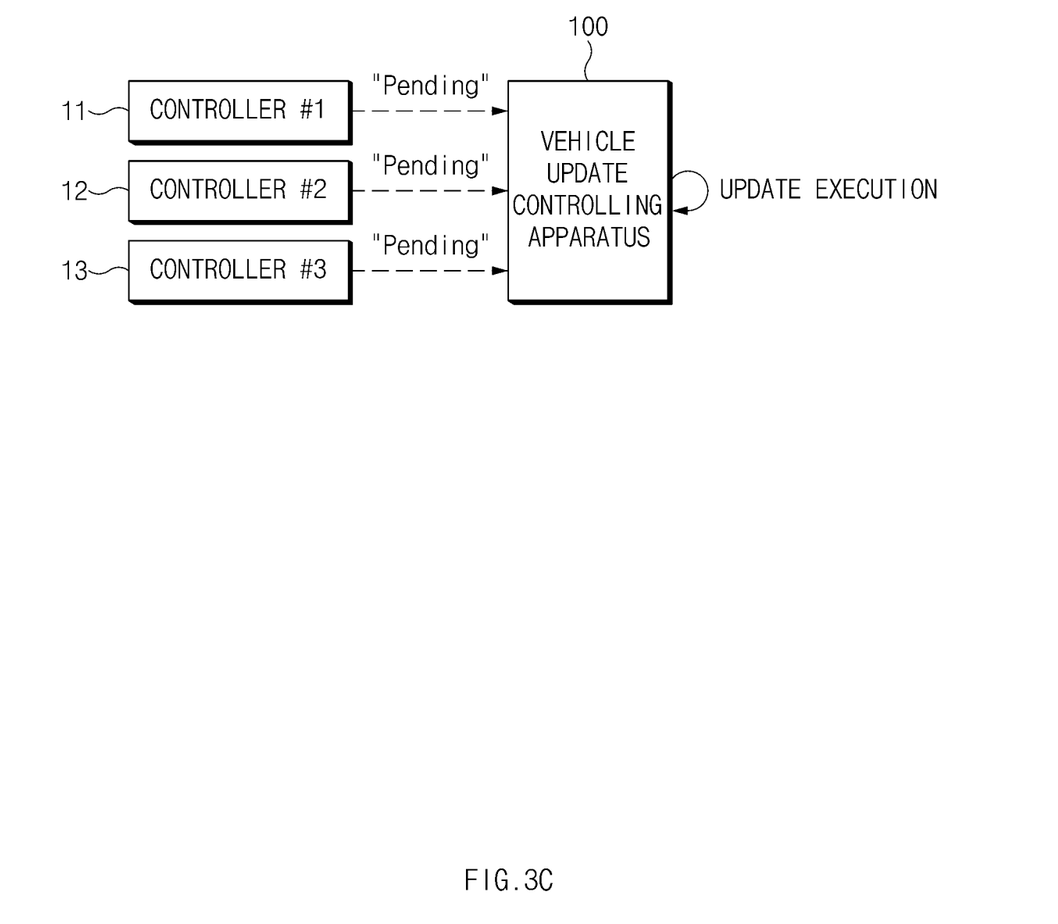

FIG. 3C illustrates a situation when "Pending" response is received from all of a plurality of controllers.

Referring to FIG. 3C, the state manager 140 transmits an update ready request signal to the first controller 11, the second controller 12, and the third controller 13; then, when a response signal is received from the first controller 11, the second controller 12, and the third controller 13, the state manager 140 may identify the states of controllers to transmit the identified result to the control device 110.

At this time, when it is determined that "Pending" response is received from all of the first controller 11, the second controller 12, and the third controller 13, the control device 110 may determine to perform the update of a vehicle. In this case, the control device 110 may transmit the state information of each controller to the update manager 150 and then may make a request for performing a reprogramming operation on the controller that receives "Positive" response within a reference time.

Figure 3D:
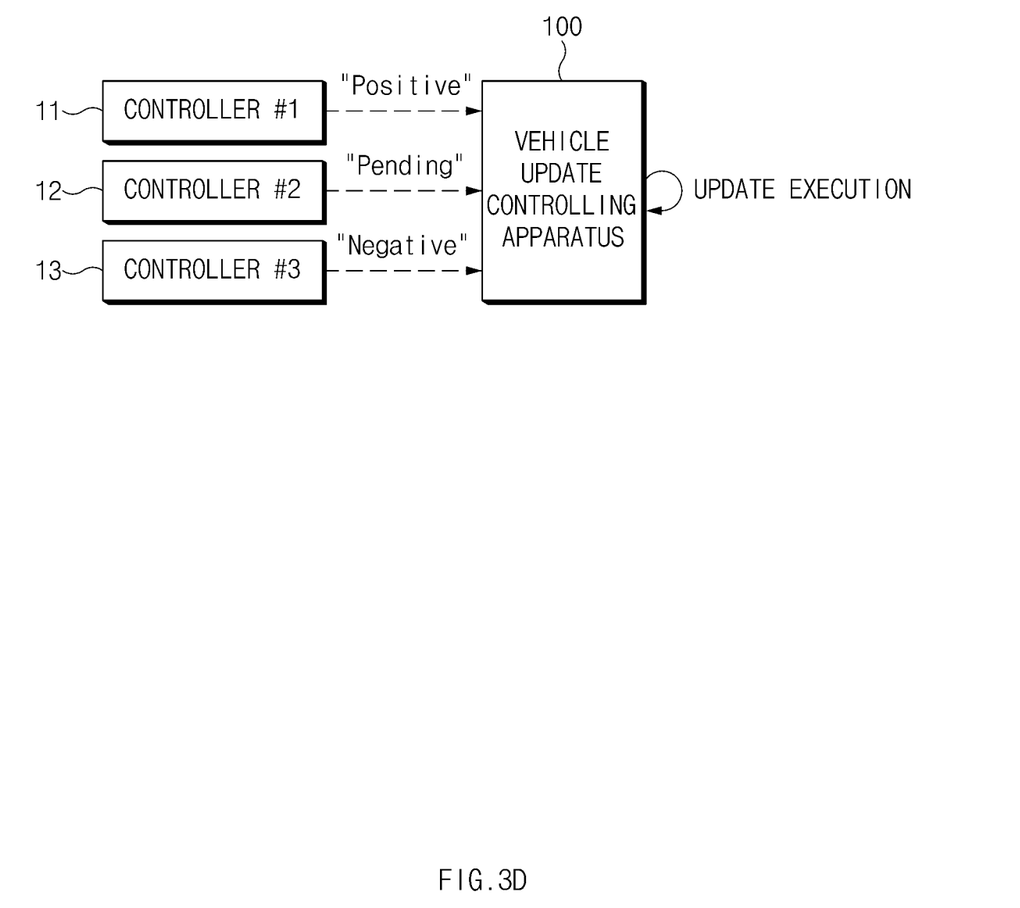

FIG. 3D illustrates a situation when "Negative" response is received from at least one of a plurality of controllers.

Referring to FIG. 3D, the state manager 140 transmits an update ready request signal to the first controller 11, the second controller 12, and the third controller 13; then, when a response signal is received from the first controller 11, the second controller 12, and the third controller 13, the state manager 140 may identify the states of controllers to transmit the identified result to the control device 110.

At this time, when it is determined that "Negative" response is received from at least one (e.g., the third controller 13) of the first controller 11, the second controller 12, or the third controller 13, the control device 110 may determine to interrupt an update of a vehicle. In this case, for the purpose of securing safety, the control device 110 may transmit the state information of each controller to the update manager 150 and then may make a request for the interruption of the execution of the reprogramming operation of controllers.

When it is determined that the update of a vehicle is performed from the control device 110, the update manager 150 identifies the state information of each of controllers received from the control device 110.

At this time, when it is determined that all of the plurality of controllers 10 are in "Pending" state, the update manager 150 may stand by during a pre-specified reference time until the state of at least one controller is switched to "Positive" state. When "Positive" state of at least one controller is identified, the update manager 150 may perform the reprogramming operation of a target controller.

In the meantime, when it is determined that the plurality of controllers 10 are in "Positive" or "Pending" state, the update manager 150 may first perform the reprogramming operation on the controller, which is in "Positive" state.

Furthermore, when it is determined that all of the plurality of controllers 10 are in "Positive" state, the update manager 150 may perform the reprogramming operation of the target controller at once.

Herein, before performing the reprogramming operation of each of the controllers, the update manager 150 may determine the reprogramming order of controllers.

The update manager 150 may determine the target controller depending on the determined reprogramming order of controllers and may perform the reprogramming operation on the determined target controller. Herein, the update manager 150 transmits ROM data corresponding to the target controller to the target controller together with a command for performing the reprogramming.

The update manager 150 may identify the reprogramming progress state of the target controller. At this time, when the reprogramming of the target controller is successful, the update manager 150 may perform the reprogramming operation on the controller of the next order.

Meanwhile, when it is determined that the reprogramming of the target controller fails, the update manager 150 may transmit the reprogramming failure information of the target controller to the control device 110.

As such, after determining whether to perform the update of the vehicle based on the reprogramming failure information of the target controller, the control device 110 may make a request for performing the reprogramming operation of the target controller again or may interrupt the update. In some forms of the present disclosure, when the reprogramming failure information of the target controller is identified, the control device 110 may interrupt the update of the vehicle at once.

Although not illustrated in FIG. 2, the vehicle update controlling apparatus 100 may further include an interface including an input means for receiving a control command from a user and an output means for outputting the operating state, the operating result, and the like of the vehicle update controlling apparatus 100.

Herein, the input means may include a key button and may include a mouse, a joystick, a jog shuttle, a stylus pen, and the like. Furthermore, the input means may also include a soft key implemented on the display.

The output means may include a display and may include a voice output means such as a speaker. At this time, when a touch sensor such as a touch film, a touch sheet, or a touch pad is included in the display, the display may operate as a touch screen and may be implemented in the form in which the input means and the output means are integrated with each other.

At this time, the display may include at least one of a liquid crystal display (LCD), a thin film transistor-liquid crystal display (TFT-LCD), an organic light-emitting diode (OLED) display, a flexible display, a field emission display (FED), or a 3D display.

The vehicle update controlling apparatus 100 in some forms of the present disclosure operating as described above may be implemented in the form of an independent hardware device including a memory and a processor for processing each operation and may be driven in the form included in other hardware devices such as a microprocessor or a general purpose computer system.

The operation flow of the vehicle update controlling apparatus in some forms of the present disclosure will be described in more detail as follows.

Figure 4:
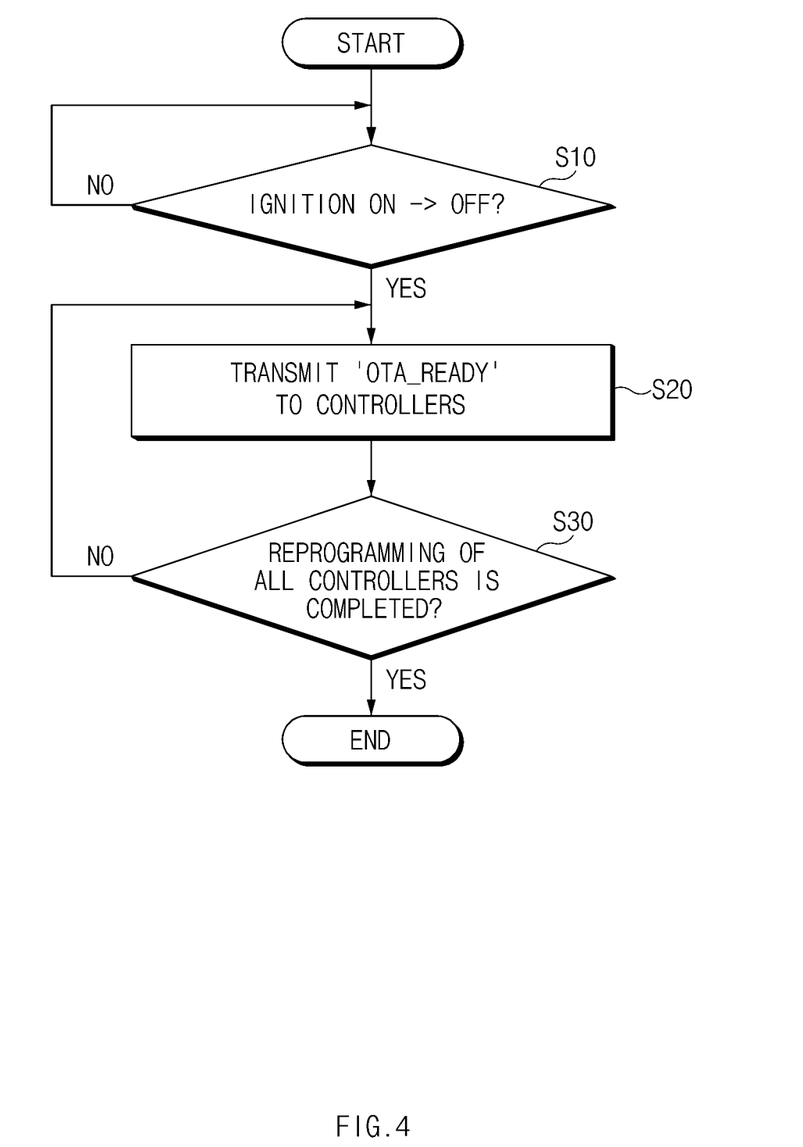
FIGS. 4 to 7 are a flowchart illustrating an operating method for controlling an update of a vehicle, in one form of the present disclosure.
Figure 5:
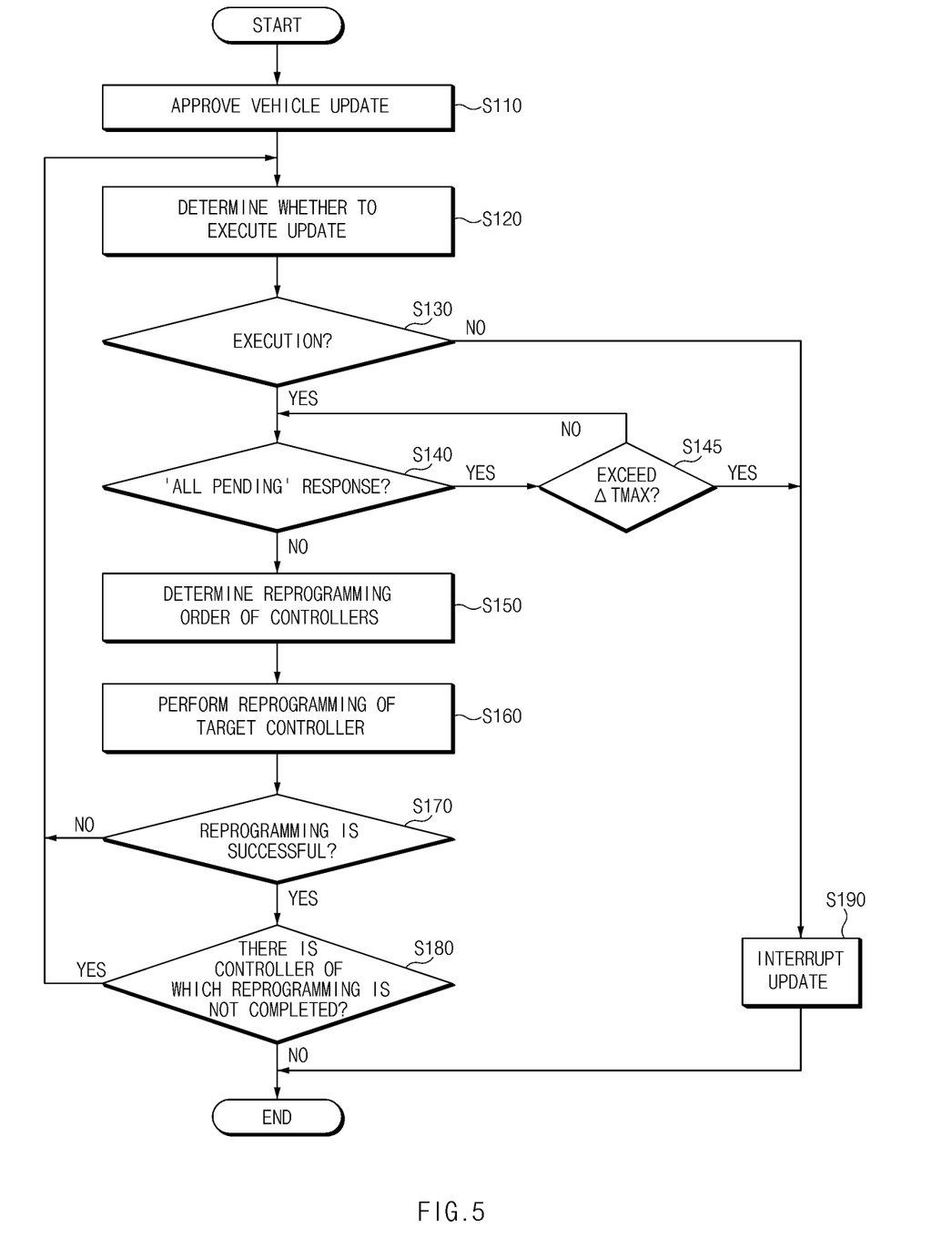
Figure 6:
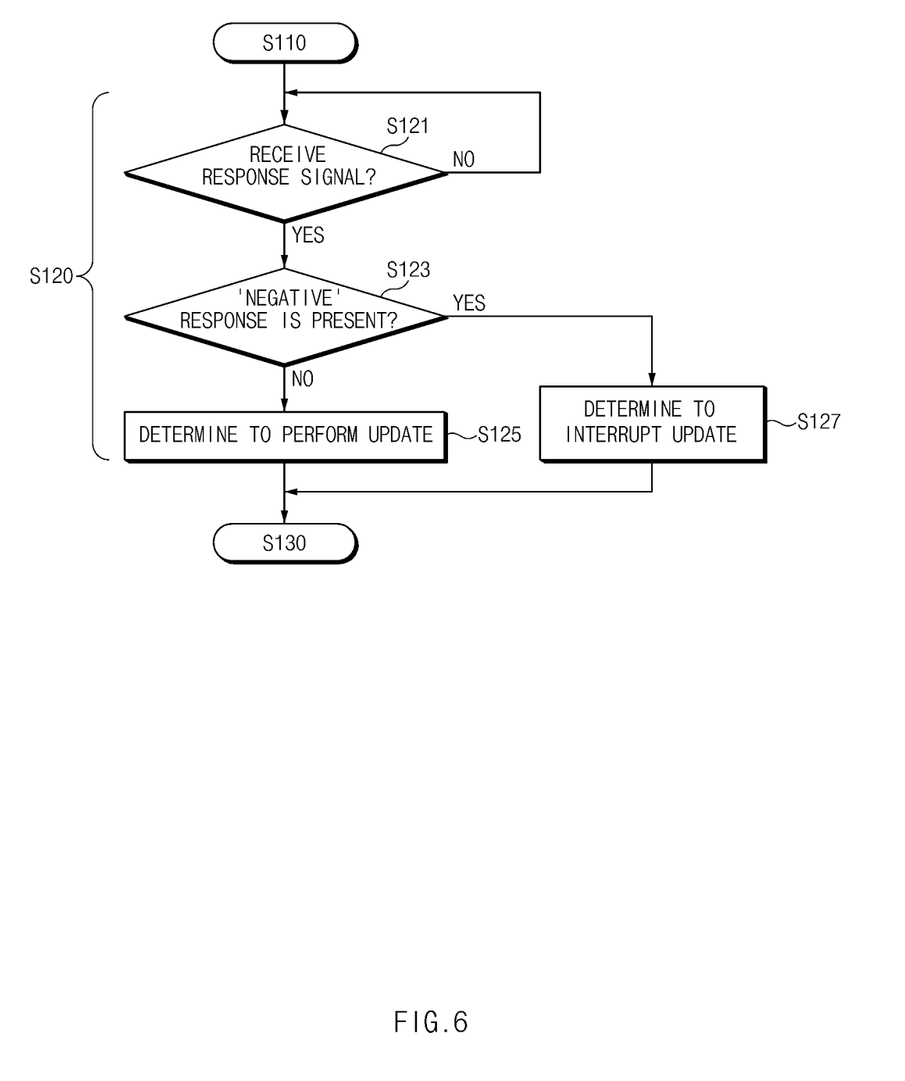

FIGS. 4, 5, and 6 are a flowchart illustrating an operating method for controlling an update of a vehicle, in some forms of the present disclosure.

First, FIG. 4 illustrates an operation of transmitting an update ready request signal to a plurality of controllers in some forms of the present disclosure.

Referring to FIG. 4, when the state of the ignition of a vehicle is switched to an off state in S10, the vehicle update controlling apparatus 100 transmits an update ready request signal such as "OTA_Ready" to controllers in S20.

Afterward, the vehicle update controlling apparatus 100 may repeatedly perform operation 'S20' at a specific period until the reprogramming of all controllers is completed.

When the reprogramming of all controllers is completed in S30, the vehicle update controlling apparatus 100 may terminate the related operation.

FIGS. 5 and 6 illustrate an operation of executing or interrupting an update depending on the states of a plurality of controllers in some forms of the present disclosure.

Referring to FIG. 5, when a vehicle update is approved from a user in S110, the vehicle update controlling apparatus 100 determines whether to execute an update in S120. Herein, the detailed operation associated with operation 'S120' will be referenced to FIG. 6.

Referring to FIG. 6, in S121, when a response signal is received from each of controllers in response to the update ready request signal transmitted to the controllers in operation 'S20' of FIG. 4, the vehicle update controlling apparatus 100 identifies the response signal. At this time, the vehicle update controlling apparatus 100 determines whether "Negative" response is present in the response signal received in operation 'S121'; when "Negative" response is not present in S123, the vehicle update controlling apparatus 100 determines to perform a vehicle update in S125.

In the meantime, the vehicle update controlling apparatus 100 determines whether "Negative" response is present in the response signal received in operation 'S121'; when "Negative" response is present in S123, the vehicle update controlling apparatus 100 determines to interrupt the vehicle update in S127.

Operation 'S121' to operation 'S127' may be performed before the first update is performed or may be performed whenever the reprogramming of any one target controller is terminated.

When it is determined, in S130, that the update is performed in operation 'S120', the vehicle update controlling apparatus 100 determines whether all of the responses of controllers are "Pending" responses in S140.

When it is determined, in operation 'S140', that the responses are 'all Pending' responses, the vehicle update controlling apparatus 100 determines whether the states of controllers are in "Pending" state, until a pre-specified reference time ΔTmax is exceeded.

When "Positive" response is not received from the one or more controllers until the pre-specified reference time ΔTmax is exceeded in S140' and 'S145', the update operation may be interrupted in S190.

In the meantime, when "Positive" response is received from one or more controllers before the pre-specified reference time ΔTmax is exceeded, the reprogramming operation may be performed.

At this time, the vehicle update controlling apparatus 100 determines the reprogramming order of controllers of "Positive" state in S150, in S160, the vehicle update controlling apparatus 100 may perform the reprogramming of the target controller depending on the reprogramming order determined in operation 'S150'.

When the reprogramming of the target controller is not successful in S170, the vehicle update controlling apparatus 100 may perform operation 'S120' again.

When there is a controller of which the reprogramming is not completed in S180, even though the reprogramming of the target controller is successful, the vehicle update controlling apparatus 100 performs operation 'S120' again.

Operation 'S120' to operation 'S180' may be repeatedly performed until the reprogramming of all controllers is completed; when the reprogramming of all controllers is completed, the related operation may be terminated.

Figure 7:
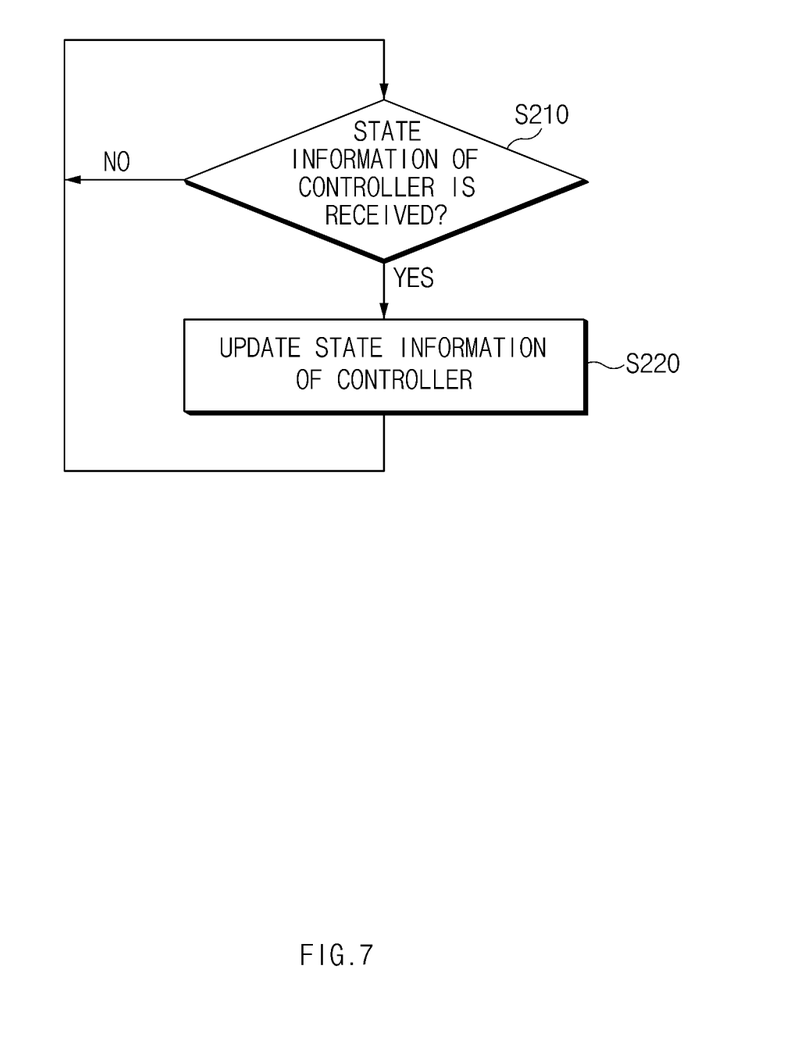

FIG. 7 illustrates an operation of managing state information about a plurality of controllers.

As illustrated in FIG. 7, the vehicle update controlling apparatus 100 may frequently receive state information about the plurality of controllers 10. When the state information about the plurality of controllers 10 is received in S210, in S220, the vehicle update controlling apparatus 100 updates the pre-stored state information of the controller as the information received in operation 'S210'.

The operations of FIG. 7 may be performed before the update of the vehicle is performed or after the execution of the update is completed; alternatively, the operations of FIG. 7 may be also performed while the update of the vehicle is being performed.

Figure 8:
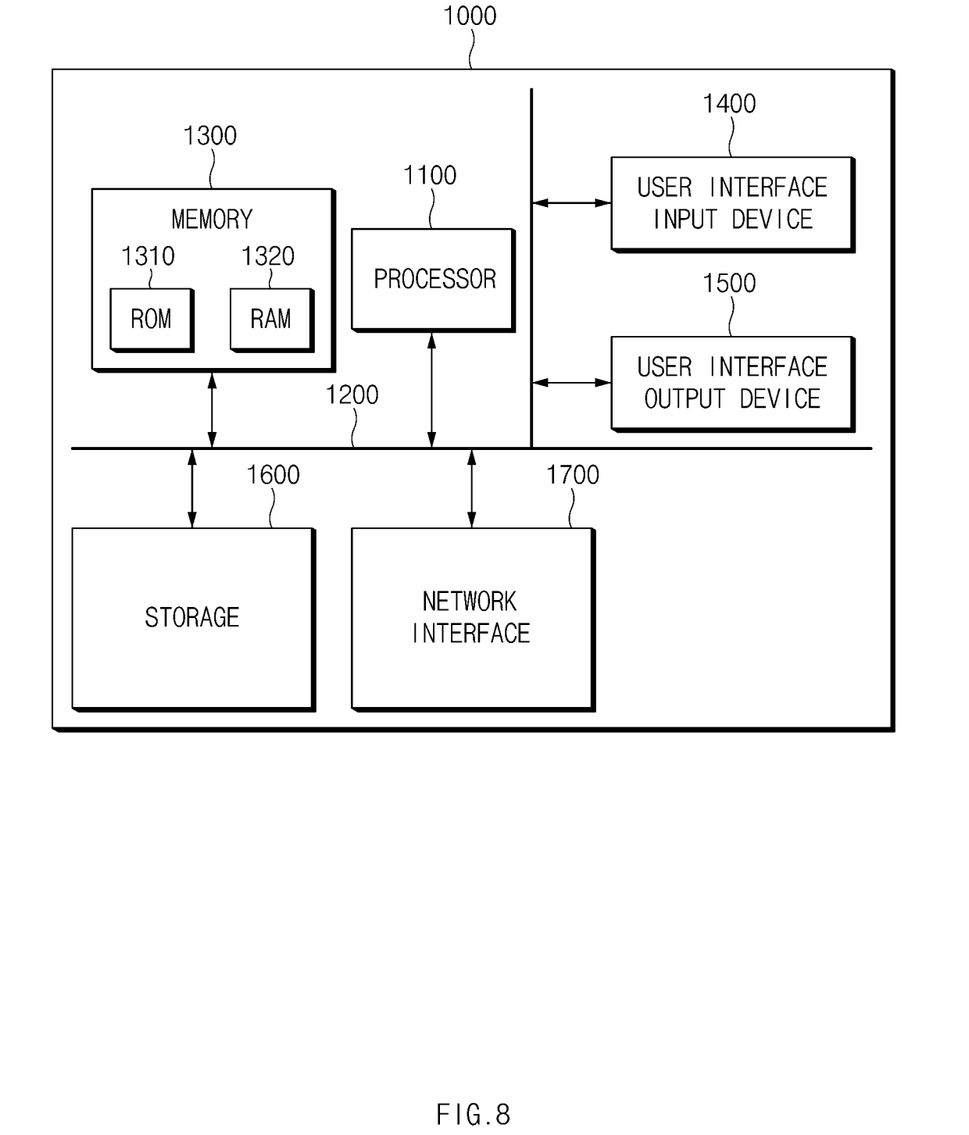
FIG. 8 is a diagram illustrating a computing system performing a method, in one form of the present disclosure.

FIG. 8 is a diagram illustrating a computing system performing a method in some forms of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

In some forms of the present disclosure, a controller wireless update may be stably performed by determining the operating state of each controller on which the reprogramming will be performed before the controller wireless update using OTA is performed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. An apparatus comprising:
    memory storing instructions executable to control a firmware update of a vehicle; and
    a processor configured to execute the instructions to:
        transmit an update ready request signal to a plurality of controllers at a pre-specified time;
        identify state information based on a response signal received from each controller of the plurality of controllers in response to the update ready request signal, wherein the response signal corresponds to an operating state of each controller of the plurality of controllers when an ignition of the vehicle is turned off;
        manage the state information regarding the plurality of controllers included in the vehicle;
        determine whether to perform the firmware update of the vehicle based on the state information when an ignition of the vehicle is turned off;

perform a reprogramming operation on at least one controller of the plurality of controllers depending on whether to perform the firmware update of the vehicle; and stop reprogramming of each controller of the plurality of controllers when responses from all the plurality of the controllers are not received within a certain time period.

2. The apparatus of claim 1, wherein the processor is configured to:

transmit the update ready request signal to the plurality of controllers when the ignition of the vehicle is turned off.

3. The apparatus of claim 1, wherein the response signal comprises at least one of a "Positive" response, a "Pending" response, or a "Negative" response.

4. The apparatus of claim 3, wherein the processor is configured to:

determine to interrupt the firmware update of the vehicle when the "Negative" response is received from at least one controller of the plurality of controllers.

5. The apparatus of claim 3, wherein the processor is configured to:

determine to perform the firmware update of the vehicle, when the "Negative" response is not received from any controller of the plurality of controllers.

6. The apparatus of claim 5, wherein the processor is configured to:

determine to interrupt the firmware update of the vehicle when all response signals received from the plurality of controllers include the "Pending" responses, and the "Positive" response is not received from at least one controller of the plurality of controllers until a reference time elapses.

7. The apparatus of claim 5, wherein the processor is configured to:

when the "Positive" response is received from a controller of the plurality of controllers transmitting the "Pending" response within a reference time, determine to perform a reprogramming of the controller of the plurality of controllers transmitting the "Pending" response.

8. The apparatus of claim 5, wherein the processor is configured to:

when at least one of the "Positive" responses is included in the response signal received from the plurality of controllers, determine to perform a reprogramming of controllers transmitting the "Positive" response.

9. The apparatus of claim 1, wherein the processor is configured to:

determine a reprogramming order of the plurality of controllers when a reprogramming of the plurality of controllers is determined; and transmit, to a target controller of the plurality of controllers, a reprogramming execution instruction and read-only memory (ROM) data depending on the determined reprogramming order.

10. The apparatus of claim 1, wherein the processor is configured to:

redetermine whether to perform the firmware update of the vehicle based on the state information when a reprogramming of a target controller of the plurality of controllers fails.

11. The apparatus of claim 1, wherein the processor is configured to:

determine to interrupt the firmware update of the vehicle when a reprogramming of a target controller of the plurality of controllers fails.

12. A method for controlling a firmware update of a vehicle, the method comprising:

transmitting, by a processor, an update ready request signal to a plurality of controllers at a pre-specified time;

identifying, by the processor, state information based on a response signal received from each controller of the plurality of controllers in response to the update ready request signal, wherein the response signal corresponds to an operating state of each controller of the plurality of controllers when an ignition of the vehicle is turned off;

managing, by the processor, the state information regarding a plurality of controllers included in the vehicle;

when an ignition of the vehicle is turned off, determining, by the processor, whether to perform the firmware update of the vehicle based on the state information; and performing, by the processor, a reprogramming operation on at least one controller of the plurality of controllers depending on whether to perform the firmware update of the vehicle; and stopping reprogramming of each controller of the plurality of controllers when responses from all the plurality of controllers is not received within a certain time period.

13. The method of claim 12, wherein the response signal comprises at least one of a "Positive" response, a "Pending" response, or a "Negative" response.

14. The method of claim 13, wherein determining whether to perform the firmware update of the vehicle comprises:

when the "Negative" response is received from at least one controller of the plurality of controllers, determining, by the processor, to interrupt the firmware update of the vehicle.

15. The method of claim 13, wherein determining whether to perform the firmware update of the vehicle comprises:

when the "Negative" response is not received from any controller of the plurality of controllers, determining, by the processor, to perform the firmware update of the vehicle.

16. The method of claim 13, wherein determining whether to perform the firmware update of the vehicle comprises:

when all response signals received from the plurality of controllers include the "Pending" responses, and the "Positive" response is not received from at least one controller of the plurality of controllers until a reference time elapses, determining, by the processor, to interrupt the firmware update of the vehicle.

17. The method of claim 13, wherein performing the reprogramming operation comprises:

when the "Positive" response is received from a controller of the plurality of controllers within a reference time, performing, by the processor, a reprogramming of a target controller of the plurality of controllers.

18. The method of claim 13, wherein performing the reprogramming operation comprises:

when at least one of the "Positive" responses is included in the response signal received from the plurality of controllers, performing, by the processor, a reprogramming of a target controller of the plurality of controllers.

19. The method of claim 12, wherein performing the reprogramming operation comprises:

when a request for reprogramming of the plurality of controllers is received, determining, by the processor, a reprogramming order of the plurality of controllers; and transmitting, by the processor, a reprogramming execution instruction and read-only memory (ROM) data to a target controller of the plurality of controllers depending on the determined order.

20. The method of claim 12, wherein the method further comprises:

when a reprogramming of a target controller of the plurality of controllers fails, redetermining, by the processor, whether to perform the firmware update of the vehicle based on the state information.

21. The method of claim 12, wherein the method further comprises:

when a reprogramming of a target controller of the plurality of controllers fails, determining, by the processor, to interrupt the firmware update of the vehicle.

* * * * *